United States Patent Office 3,097,206
Patented July 9, 1963

3,097,206
AMINOMETHYLTHIENYL AND FURYL ALCOHOL DERIVATIVES
Charles L. Zirkle, Berwyn, Pa., assignor to Smith Kline & French Laboratories, Philadelphia, Pa., a corporation of Pennsylvania
No Drawing. Filed Mar. 19, 1962, Ser. No. 180,857
13 Claims. (Cl. 260—268)

This invention relates to new basic heterocyclic alcohols having particular utility as pharmacodynamic agents. More specifically the compounds of this invention have not only antispasmodic activity but pronounced antihypercholesterolemic activity. Many of these compounds also are useful as intermediates for preparing other medicinal agents.

The compounds of this invention are illustrated by the structural formula:

FORMULA I

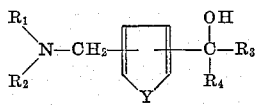

in which:

$R_1$ and $R_2$ are hydrogen, lower alkyl or cycloalkyl of from 1–6 carbon atoms or, when taken together, represent N-piperidinyl, N-pyrrolidinyl, N-morpholinyl, N-thiomorpholinyl, N-loweralkyl-N-piperazinyl;

Y is oxygen or sulfur;

$R_3$ is alkyl or cycloalkyl of from 1–8 carbons, phenyl, α-thienyl, α-furyl, substituted phenyl or their equivalents;

$R_4$ is phenyl, substituted phenyl or, when identical with $R_3$, α-thienyl, α-furyl or their equivalents.

The furan congeners of the series are preferred.

The attachments on the heterocyclic nucleus are preferably at the α-position on the heterocyclic ring because of the easier preparation of the starting materials for these compounds.

The term substituted phenyl is used to define phenyl moieties substituted by one or more inert radicals such as a lower alkyl of 1–4 carbon atoms for instance methyl or ethyl, lower alkoxy of 1–4 carbon atoms such as methoxy or ethoxy, nitro, trifluoromethyl, fluoro, etc. One skilled in the art will readily recognize which groups will be stable under the reaction conditions described. All such moieties are fully equivalent to phenyl as used herein.

Also included in this invention are the nontoxic, pharmaceutically acceptable acid addition and quaternary ammonium salts of the above bases. These salts are prepared by reacting the bases with one molar equivalent or preferably with an excess of the acid or an active halide either in a nonpolar or polar solvent such as ether, ethyl acetate, benzene, acetone, etc. The desired salt either separates or is recovered by concentration and cooling. Exemplary of the pharmaceutically acceptable acids to be used are the mineral acids such as hydrochloric, phosphoric, sulfuric, hydrobromic or sulfamic acids or the organic acids such as citric, maleic, ethanedisulfonic, salicylic, fumaric, acetic or glycolic acids. Exemplary of the quaternary salts are those in general having a maximum of 8 carbon atoms and derived from methyl iodide, ethyl chloride, methyl toluene sulfonate, chlorohydrin, methyl hydrogen sulfate, butyl bromide, etc.

Also included in this invention are the simple functional derivatives of the amino tertiary alcohols of this invention such as the acetate, carbamate, etc. derivatives. These compounds are prepared by known methods such as by acylation with an acid halide or anhydride. One skilled in the art will recognize that optical isomers may be present in certain of these compounds. These are also included within the scope of this invention.

The compounds of this invention are prepared from known starting materials as follows:

Procedure 1

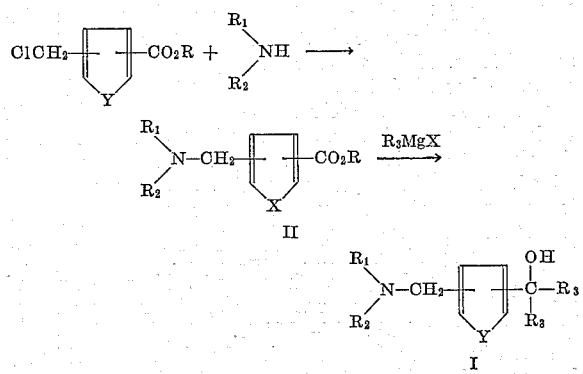

Procedure 2

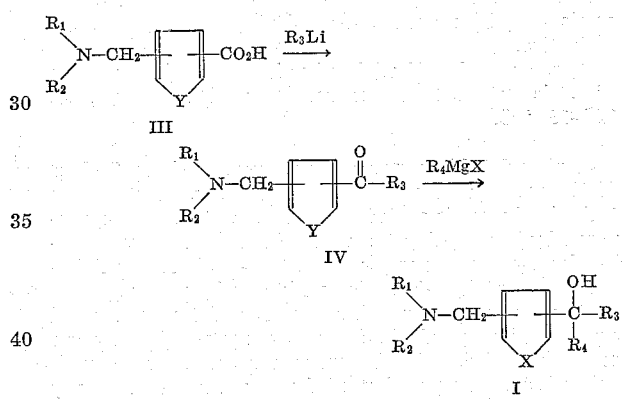

in which R is lower alkyl of from 1–4 carbons, $R_1$–$R_4$, Y and X are as described above.

The compounds of this invention in which $R_3$ and $R_4$ are identical are prepared by reacting the tertiary aminomethylfuryl or thienylcarboxylic esters (II) with an excess of a Grignard agent or an equivalent organometallic agent. The reaction is usually carried out in a nonpolar organic solvent such as ether at from room temperature up to the reflux temperature of the reaction mixture.

The compounds in which $R_3$ and $R_4$ are different are prepared by reacting the carboxylic acids (III) with slightly more than two molar equivalents of an organic lithium reagent to give the important keto intermediates (IV) which are then further reacted with another organometallic reagent such as a Grignard reagent, to give the desired unsymmetrical carbinol.

The compounds in which one of $R_1$ and $R_2$ is hydrogen are prepared by using an excess of the organometallic reagent in order to compensate for reaction with the amine moiety. The free amine is then regenerated by subsequent hydrolysis.

The term "cycloalkyl" as used herein is preferably cyclohexyl and cyclopentyl.

The following examples will fully illustrate the methods of preparation of the intermediates and the hypocholesterolemic agents of this invention to those skilled in the art but are not to be construed as limiting the scope of this invention.

EXAMPLE 1

A solution of 23.3 g. (0.1235 mole) of 5-(chloromethyl)ethyl furoate (Ann. 580, 179 (1953)) in 35 ml. of benzene is added gradually over one hour to a refluxing solution of 18.5 g. (0.247 mole) of diethylamine in 30 ml. of dry benzene. After refluxing for 5 hours, a large excess of ether is added. The separated salt is washed with ether. The ethereal extracts are combined and evaporated to give an oil, 5-(diethylaminomethyl)-2-ethyl furoate, B.P. 97–106° C. at 0.1 mm.

A solution of 15 g. (0.0661 mole) of the furoate ester in 28 ml. of dry ether is added to a cold Grignard mixture prepared from 43.4 g. (0.2765 mole) of bromobenzene, 6.35 g. of magnesium turnings and 130 ml. of dry ether. After stirring one hour at room temperature and heating at reflux for two hours, the mixture is cooled in an ice bath while 263 g. of the sodium salt of ethylenediamine tetraacetic acid in 315 ml. of water is slowly added. The ether layer is separated. The water layer is extracted exhaustively with ether and chloroform. Evaporation gives 2-(diethylaminomethyl)-5-(diphenylhydroxymethyl)furan, M.P. 112–113° C.

A small sample (1 g.) is reacted with an excess of methyl bromide in acetone to give the methobromide quaternary salt, M.P. 185–186° C.

Another sample (500 mg.) in ether is treated with dry hydrogen chloride to give the hydrochloride salt.

Another sample (1 g.) in ether is reacted with excess acetic anhydride on the steam bath to give the acetate derivative.

Another portion (1 g.) in ether is treated with an excess of citric acid solution to form the citrate salt, M.P. 129–130° C.

EXAMPLE 2

A phenyl lithium preparation prepared from 28.0 g. (0.178 mole) of bromobenzene and 2.5 g. of lithium in 155 ml. of ether is cooled while 14.0 g. (0.071 mole, prepared by hydrolyzing the ester of Example 1 by refluxing for 44 hours in water, M.P. 181–182° C.) of 5-(diethylaminomethyl)-2-furoic acid is added carefully. After heating at reflux for 6 hours under nitrogen, a small amount of ethyl alcohol, then an excess of water are carefully added. The brown mixture is extracted with chloroform. Evaporation of the dry extracts gives oily 2-(diethylaminomethyl)-5-(benzoyl)furan, B.P. 136–143° C. at 0.15 mm.

The methobromide salt made in acetone melts at 169–171° C. The hydrochloride made in ether melts at 155–156° C.

A Grignard solution prepared from 9.3 g. of p-bromoanisole, 2.2 g. of magnesium turnings and 100 ml. of ether is reacted with 9 g. of the ketone in ether. After reaction at room temperature and reflux for 5 hours, quenching in an ice slurry and working up as in Example 1 gives 2-(diethylaminomethyl) - 5 - (phenylanisylhydroxymethyl)-furan. This compound (500 mg.) in ether-acetone forms a maleate salt wtih maleic acid. With ethyl chloride in acetone the base forms an ethochloride quaternary salt.

Substituting the methyl Grignard reagent in the reaction above in excess gives 2-(diethylaminomethyl)-5-(α-hydroxy-α-phenylethyl)furan. Neutralization of an ether solution of 750 mg. of the base with phosphoric acid gives the phosphate salt.

EXAMPLE 3

A solution of 11.5 g. of 5-(chloromethyl)ethyl furoate, 9 g. of N-methylpiperazine and 100 ml. of benzene is heated at reflux overnight. The filtrate upon evaporation gives 5-(N-methylpiperazinylmethyl)-2-ethyl furoate.

A solution of 6 g. of the ester in 75 ml. of ether is reacted with the Grignard reagent prepared from 15.6 g. of o-bromotoluene as in Example 1. Quenching in a chelating solution and working up the organic layers as in Example 1 gives 2-(N-methylpiperazinylmethyl)-5-(di-o-toluylhydroxymethyl)furan. This material (750 mg.) in acetone with an excess of hydrogen chloride gives a dihydrochloride; with an excess of methyl iodide upon gentle warming, a dimethiodide. Substituting phenyl magnesium bromide in the Grignard reaction gives 2-(N-methylpiperazinylmethyl)-5-(diphenylhydroxymethyl)furan.

EXAMPLE 4

Phenyl lithium (prepared from 1.6 g. of bromobenzene) in ether solution is reacted with 4.6 g. of 5-(N-methylpiperazinylmethyl)-2-furoic acid (prepared by hydrolyzing the ester as described as in Example 2). Evaporation of the organic extracts give 2-(N-methylpiperazinylmethyl)-5-(benzoyl)furan. This compound (2 g.) is reacted with the Grignard reagent of p-bromotrifluoromethylbenzene in excess as in Example 2 to give 2-(N-methylpiperazinylmethyl) - 5 - (phenyl - p - trifluoromethylphenylhydroxymethyl)furan. This material (500 mg.) in ethyl acetate with an excess of ethanedisulfonic acid gives the bisethanedisulfonate salt.

Substituting isoheptyl magnesium iodide in this Grignard reaction gives 2-(N-methylpiperazinylmethyl)-5-(α-phenyl-α-hydroxyisooctyl)furan.

EXAMPLE 5

A solution of 10.3 g. of 5-(chloromethyl)-2-carbomethoxythiophene (Chem. Abst. 54, 13094), in a saturated solution of dimethylamine/ethanol is heated in a closed container to give the desired 5-(dimethylaminomethyl)-2-carbomethoxythiophene. This compound (2 g.) is reacted with an excess of 2-thienylmagnesium bromide as in Example 1 to give the desired 5-(dimethylaminomethyl)-2-(dithienylhydroxymethyl)-thiophene and its phosphate salt.

Reaction with phenylmagnesium bromide in equimolar quantities gives the diphenyl analogue.

EXAMPLE 6

A solution of 21 g. of 5-(chloromethyl)-2-carbomethoxythiophene, 15 g. of pyrrolidine and 150 ml. of benzene is heated at reflux for 6 hours. Working up as described gives 5-(N-pyrrolidinylmethyl)-2-carbomethoxythiophene. This compound (25 g.) is hydrolyzed by refluxing a water mixture for 40 hours. The resulting acid (3 g.) in ether is reacted with a slight excess of phenyl lithium as in Example 2 to give 5-(N-pyrrolidinylmethyl)-2-benzoylthiophene.

This material (10 g.) is reacted at reflux for 6 hours with an excess of m-toluyl magnesium bromide to give 5-(N - pyrrolidinylmethyl)-2-(phenyl-m-toluyl-hydroxymethyl)thiophene. Reaction with methyl toluenesulfonate in benzene gives the quaternary salt, with acetic acid in ether, the acetate salt.

Reacting the benzoyl intermediate with an excess of 2-furyl magnesium iodide gives 5-(N-pyrrolidinylmethyl)-2-(phenyl-2-furyl-hydroxymethyl)thiophene.

EXAMPLE 6

Substituting, in molar equivalent amounts, 4-dimethylaminomethyl-5-ethyl-2-ethyl furoate (Chem. Abst. 53, 18934) and phenyl magnesium iodide in the process of Example 1 gives 4-dimethylaminomethyl - 5 - ethyl-2-(diphenylhydroxymethyl)furan.

Substituting 4-chloromethyl-5-methyl-2-methyl furoate (Chem. Abst. 52, 12835) and piperidine in Example 1 gives the 4-piperidinyl compound which in molar equivalent amounts in the lithium process of Example 2 gives 4-(N-piperidinylmethyl)-5-methyl-2-benzoyl furan. Reaction with butyl magnesium bromide gives 4-(N-piperidinylmethyl)-5-methyl-2-(α-phenyl - α - hydroxypentyl)furan and its salts.

Substituting morpholine or thiomorpholine for diethylamine in the processes of Examples 1 and 2 give 2-(N-morpholinylmethyl) - 5-(diphenylhydroxymethyl)furan, 2-(N-morpholinylmethyl)-5-(benzoyl)furan, 2-(N-morpholinylmethyl)-5-(phenylanisylhydroxymethyl)furan as well as the thiomorpholinyl congeners.

Substituting α-furyl magnesium iodide for the phenyl

Grignard in Example 1 gives 2-(diethylaminomethyl)-5-(difurylhydroxymethyl)furan.

Substituting dibutylamine for the diethylamine in Example 1 gives 5-(dibutylaminomethyl) - 5 - (diphenylhydroxymethyl)furan.

Substituting cyclohexyl magnesium bromide in molar equivalent quantities for the methyl Grignard reagent in Example 2 gives 2-(diethylaminomethyl)-5-(phenylcyclohexylhydroxymethyl)furan.

Substituting n-butylamine for diethylamine in Example 1 gives 5-(n-butylaminomethyl)-2-ethyl furoate. Reacting this product with an excess of phenyl magnesium bromide in ether as in Example 1 gives upon quenching and reacting with a sequestering agent 2-(n-butylaminomethyl)-5-(diphenylhydroxymethyl)furan. Reaction with hydrogen chloride gas in ether gives the hydrochloride.

What is claimed is:

1. A compound selected from the group consisting of a free base, its nontoxic, pharmaceutically acceptable acid addition salts and its nontoxic, pharmaceutically acceptable quaternary ammonium salts, said free base having the formula:

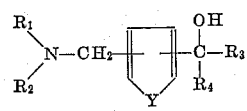

in which:
Y is a member selected from the group consisting of S and O;
$R_1$ and $R_2$ are members selected from the group consisting of lower alkyl, hydrogen, cycloalkyl and, when taken together with the nitrogen atom to which they are attached, piperidinyl, pyrrolidinyl, morpholinyl, thiomorpholinyl and N-lower alkyl-piperazinyl, said lower alkyl and cycloalkyl groups having from 1–6 carbon atoms;
$R_3$ is a member selected from the group consisting of phenyl, α-furyl, α-thienyl and alkyl and cycloalkyl having from 1–8 carbon atoms and;
$R_4$ is a member selected from the group consisting of phenyl and, when identical with $R_3$, α-furyl and α-thienyl.

2. A compound of the formula:

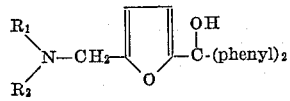

in which $R_1$ and $R_2$ are lower alkyl of from 1–6 carbon atoms.

3. A compound of the formula:

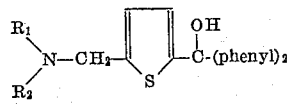

in which $R_1$ and $R_2$ are lower alkyl of from 1–6 carbon atoms.

4. A compound of the formula:

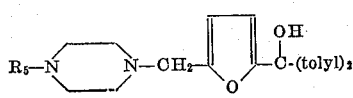

in which $R_5$ is lower alkyl of from 1–6 carbon atoms.

5. A compound of the formula:

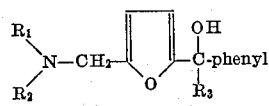

in which $R_1$ and $R_2$ are lower alkyl of from 1–6 carbon atoms and $R_3$ is a lower alkyl of from 1–8 carbon atoms.

6. 2 - (diethylaminomethyl) - 5 - (diphenylhydroxymethyl)furan.

7. 2 - (diethylaminomethyl) - 5 - (diphenylhydroxymethyl)furan methobromide.

8. 2 - (diethylaminomethyl) - 5 - (diphenylhydroxymethyl)furan citrate.

9. 2 - (diethylaminomethyl) - 5 - (α - hydroxy - α - phenylethyl)furan.

10. 5 - (dimethylaminomethyl) - 2 - (dithienylhydroxymethyl)thiophene.

11. A compound of the formula:

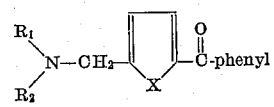

in which:
X is a member selected from the group consisting of S and O; and
$R_1$ and $R_2$ are members of the group consisting of lower alkyl and, when taken together with the nitrogen atom to which they are attached, piperidinyl, pyrrolidinyl, morpholinyl, thiomorpholinyl and N-lower alkyl piperazinyl, said lower alkyl groups having from 1–6 carbon atoms.

12. 2-(diethylaminomethyl)-5-benzoylfuran.
13. 2-(N-pyrrolidinylmethyl)-5-benzoylthiophene.

References Cited in the file of this patent

Chemical Abstracts, vol. 51, page 14, 720 (1957), QD 1.A51.

Gill et al.: Journal Chemical Society, London, pp. 4728–31 (1958).

Chemical Abstracts, vol. 54, pp. 7674–5 (1960), QD 1.A51.